United States Patent
Nakajo

(10) Patent No.: US 8,667,114 B2
(45) Date of Patent: Mar. 4, 2014

(54) PROGRAM UPDATE MANAGEMENT SERVER AND PROGRAM UPDATE MANAGEMENT METHOD

(75) Inventor: Shoichi Nakajo, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 53 days.

(21) Appl. No.: 13/372,865

(22) Filed: Feb. 14, 2012

(65) Prior Publication Data

US 2012/0209977 A1    Aug. 16, 2012

(30) Foreign Application Priority Data

Feb. 15, 2011  (JP) .................................. 2011-029496
Feb. 15, 2011  (JP) .................................. 2011-029497

(51) Int. Cl.
  *G06F 15/173*     (2006.01)
(52) U.S. Cl.
  USPC ......................................................... 709/223
(58) Field of Classification Search
  USPC ......................................................... 709/223
  See application file for complete search history.

(56) References Cited

U.S. PATENT DOCUMENTS

| | | | | |
|---|---|---|---|---|
| 5,751,303 | A | * | 5/1998 | Erickson et al. ................. 347/16 |
| 5,920,725 | A | * | 7/1999 | Ma et al. ........................ 717/171 |
| 7,171,661 | B1 | * | 1/2007 | Pinera et al. ................... 717/172 |
| 7,191,218 | B1 | * | 3/2007 | Innes ............................. 709/206 |
| 7,281,024 | B1 | * | 10/2007 | Banerjee et al. ............... 707/623 |
| 2007/0035757 | A1 | * | 2/2007 | Aikawa ........................ 358/1.13 |
| 2008/0107443 | A1 | * | 5/2008 | Snyder ............................ 399/88 |
| 2008/0313626 | A1 | * | 12/2008 | Kodaka et al. ................ 717/168 |
| 2009/0150878 | A1 | * | 6/2009 | Pathak et al. ................. 717/172 |
| 2011/0029966 | A1 | * | 2/2011 | Moshir et al. ................. 717/173 |

FOREIGN PATENT DOCUMENTS

JP  2006-243915   9/2006
JP  2007-213370   8/2007

* cited by examiner

*Primary Examiner* — Alicia Baturay

(57) ABSTRACT

A program update management server includes a storage unit configured to store an update program for updating a program to be managed, a setting unit configured to set an update timing in accordance with each client in which the program to be managed is installed, an update recommending unit configured to transmit information regarding recommendation of an update so that the client acquires the update program at the update timing, and a program transmitting unit configured to transmit the update program, at the update timing, to the client that receives the information regarding recommendation of an update.

14 Claims, 4 Drawing Sheets

PROGRAM UPDATE MANAGEMENT SERVER AND PROGRAM UPDATE MANAGEMENT METHOD

CROSS REFERENCES TO RELATED APPLICATIONS

The present invention contains subject matter related to Japanese Patent Application No. 2011-029496 filed in the Japanese Patent Office on Feb. 15, 2011 and Japanese Patent Application No. 2011-029497 filed in the Japanese Patent Office on Feb. 15, 2011, the entire contents of which are incorporated herein by reference.

BACKGROUND

1. Technical Field

The present invention relates to a program update management server and a program update management method, and particularly to a technology that automatically updates a computer program to be executed on an electronic device.

2. Related Art

Technologies that implement automatic updating of a computer program (hereinafter referred to simply as a program) by using polling for update information provided by a server are known. For example, when a program installed in a personal computer (PC) is terminated, or when a preset date and time has arrived, the PC accesses a server via a network and acquires information capable of identifying the latest version of the program installed in the PC. If a program installed in a PC is not the latest, the PC automatically downloads the latest program from a server.

JP-A-2006-243915 and JP-A-2007-213370 are examples of related art.

Unfortunately, in the case where the period of polling is set to be long, there is a problem in that the timing for update of a program is delayed. In contrast, in the case where the period of polling is set to be short, there is a problem in that, immediately after the latest program becomes downloadable, the program is simultaneously downloaded to many clients for a short period, thus resulting in increased loads imposed on network traffic and a server.

SUMMARY

An advantage of some aspects of the invention is that it enables a program to be automatically updated efficiently at an appropriate timing.

(1) According to an aspect of the invention, a program update management server includes a storage unit configured to store an update program for updating a program to be managed, a setting unit configured to set an update timing in accordance with each client of a plurality of clients in which the program to be managed is installed, an update recommending unit configured to transmit information regarding recommendation of an update so that the client acquires the update program at the update timing, and a program transmitting unit configured to transmit the update program, at the update timing, to the client that receives the information regarding recommendation of an update.

According to the aspect of the invention, the update program is transmitted to each client at the update timing set in accordance with the client, and therefore it becomes possible to automatically update a program of the client efficiently at an appropriate timing.

The program update management server according to the aspect of the invention may further include a reception unit configured to receive, from the client, client information capable of identifying a version of the program to be managed, the program to be managed being installed in the client, and a detection unit configured to detect a status of the client. In this case, the setting unit may set the update timing in accordance with at least the version and the status.

According to the aspect of the invention, the update program is transmitted to the client at the update timing set in accordance with the client information and the status, and therefore it becomes possible to automatically update a program of the client efficiently at an appropriate timing.

(2) In the program update management server according to the aspect of the invention, the setting unit may set timings at which an update is to be recommended for the plurality of clients such that the timings at which an update is to be recommended are dispersed.

According to the aspect of the invention, timings at which an update program is transmitted to clients can be dispersed.

(3) In the program update management server according to the aspect of the invention, the setting unit may identify a frequency of use of the program to be managed, the program to be managed being installed in the client, on the basis of the client information, and set the timing at which an update is to be recommended in accordance with the frequency of use.

According to the aspect of the invention, it is possible to adjust, in accordance with the frequency of use, a timing at which an update program is transmitted to a client.

(4) In the program update management server according to the aspect of the invention, the setting unit may identify a difference between the version of the program to be managed that is installed in the client and the version of the program to be managed after update, on the basis of the client information, and may set, on the basis of the difference, a timing at which an update is to be recommended.

According to the aspect of the invention, it is possible to adjust, in accordance with the version of a program installed in a client, a timing at which an update program is transmitted to the client.

(5) In the program update management server according to the aspect of the invention, the program transmitting unit may transmit the update program in response to a program request received from the client.

According to the aspect of the invention, an update program can be transmitted in such a manner as to avoid a timing at which a client is in a state that is undesirable for performing other processing, such as a busy state.

(6) According to another aspect of the invention, a client apparatus includes a storage unit configured to store a program to be managed; an update recommending unit configured to receive information regarding recommendation of an update in response to an update timing, the update timing being set for each client in which the program to be managed is installed; a program reception unit configured to receive an update program from a server at the update timing corresponding to the information regarding recommendation of an update; and an updating unit configured to update the program to be managed using the received update program.

It is to be noted that the functions of the units according to the aspects of the invention are implemented with hardware resources whose functions are determined by their structures themselves, with hardware resources whose functions are determined by programs, or in a combination of these resources.

The functions of these units are not limited to those implemented with hardware resources that are physically independent of each other. For example, the program update management server according to the aspects of the invention is not limited to one implemented with a single computer. The program update management server may be implemented as a group in a combination of a plurality of computers that are assigned respectively to the units.

Embodiments of the invention can be made as a method, a computer program that realizes the above functions on a server or a printer, and as a recording medium of the program. Needless to say, the recording medium of the computer program may be a magnetic recording medium, a magneto-optical medium, or any recording medium that will be developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
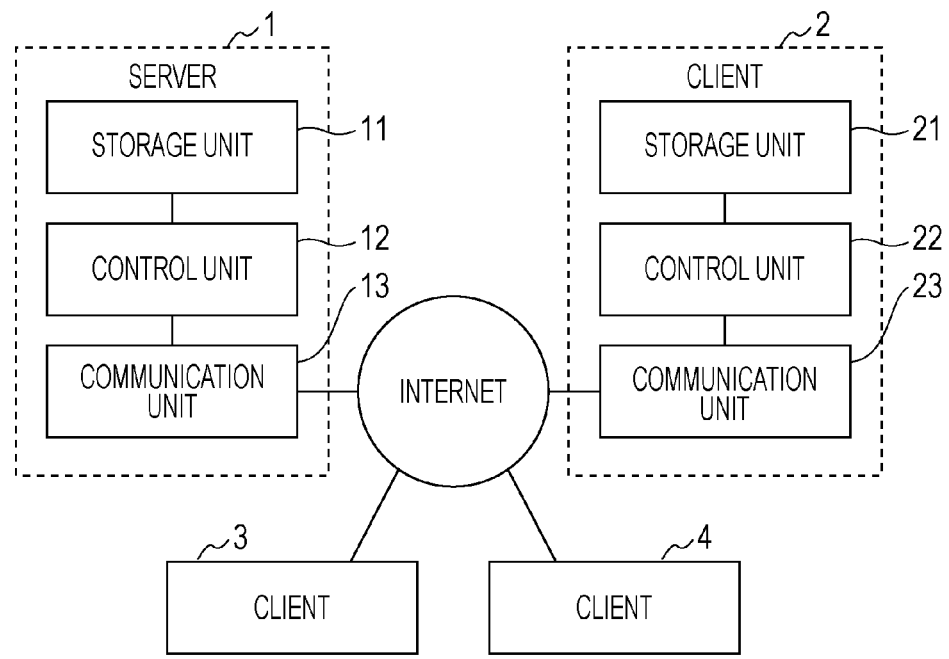
FIG. 1A is a block diagram illustrating a program update management server and clients.
FIG. 1B is a data structure table illustrating a client database.

An embodiment of the invention will be described below with reference to the accompanying drawings. In the drawings, the corresponding elements are denoted by the same reference numerals, and overlapping description is omitted.

1. Configuration

FIG. 1A is a block diagram illustrating a program update management server 1 as one example of the present invention. The program update management server 1 is a server configured to manage update of a specific program (program to be managed) installed in each of a plurality of clients 2, 3, and 4.

The program update management server 1 includes a storage unit 11 having a nonvolatile storage medium, such as a hard disk, a communication unit 13 connected to a data telecommunication line, and a control unit 12 having a central processing unit (CPU), a random access memory (RAM), and an input-output interface that are not illustrated. By executing a program for managing program update that is installed in the storage unit 11, the control unit 12 stores an update program and client information in a predetermined area of the storage unit 11, sets a timing at which an update is to be recommended on the basis of the client information, or transmits information regarding recommendation of an update to a client 2 over the Internet. In the predetermined area of the storage unit 11, a client database 211 illustrated in FIG. 1B is stored. The client database 211 is a database in which an Extensible Messaging and Presence Protocol (XMPP) Jabber identifier (JID) and an XMPP password for communicating with the client 2 via XMPP, identification information on a program to be managed that is installed in the client 2, a power supply status indicating the state of the power supply of the client 2, the date and time of the last printing in the client 2, the timing at which an update for the client 2 is to be recommended, and so on are registered in association with a client ID that is identification information unique to each client 2. Note that the timing at which an update is to be recommended is data indicating date and time.

The clients 2, 3, and 4 are electronic devices, such as PCs, printers, facsimiles, and cellular telephone terminals. Each of the clients 2, 3, and 4 includes a storage unit 21 having a nonvolatile storage medium, such as a hard disk or a flash memory, a communication unit 23 connected to a data telecommunication line, and a control unit 22 having a CPU, a RAM, and an input-output interface that are not illustrated. The control unit 22 controls the storage unit 21, the communication unit 23, and other devices that are not illustrated by executing various programs stored in the storage unit 21. By running an installer installed in the storage unit 21, the control unit 22 also updates a program associated with the installer. Hereinafter, assuming that the clients 2, 3, and 4 are printers connected to the Internet, and that a printing control program, as a program to be managed, and an installer for updating the printing control program are stored in the storage unit 21, a description will be given of processing for updating the printing control program of the client (printer) 2.

2. Setup Sequence

Figure 2:
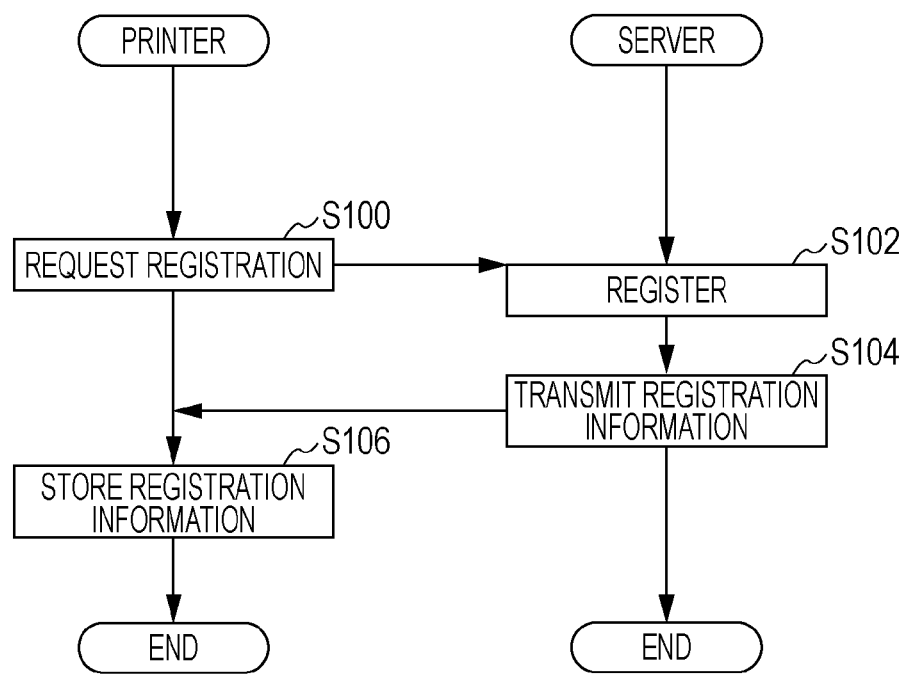
FIG. 2 is a sequence diagram illustrating a setup sequence.

Registering the printer 2 in the program update management server 1 causes the printing control program installed in the printer 2 to become a program to be managed to which an update program is to be provided from the program update management server 1. FIG. 2 illustrates a setup sequence for registering the printer 2 in the program update management server 1.

First, the printer 2 transmits the model ID and serial number of the printer 2, as a request for registration regarding the printer 2, to the uniform resource locator (URL) of the program update management server 1, which is to respond to the request for registration, using HyperText Transfer Protocol (HTTP) (S100). The request for registration may be automatically initiated during the setup of the printer 2, may be initiated by a user's operation of an operation panel (not illustrated) provided in the printer 2, or may be initiated by a user's operation of a PC connected to the printer 2.

Upon receiving the request for registration, the program update management server 1 registers the printer 2 in the program update management server 1 on the basis of the request for registration (S102). Specifically, referring to registration information on other printers that has been already registered, the program update management server 1 assigns the client ID, XMPP JID, and XMPP login password corresponding to the model-unique ID and serial number of the printer 2 contained in the request for registration to the printer 2 in such a manner that the client ID, XMPP JID, and XMPP login password for the printer 2 are not identical to those for other printers. Subsequently, the program update management server 1 registers the XMPP JID and XMPP login password, as registration information, in association with the client ID in the client database 211. Assigning the client ID based on the model-unique ID and serial number of the printer 2 ensures that a client ID, which is different for each printer, is assigned to the printer 2 even in the case where serial numbers are assigned to printers in a system that is different for each model. The XMPP JID may be assigned by combining the XMPP domain name and client ID of the program update management server 1.

The program update management server 1 that has registered the printer 2 transmits the registration information on the printer 2 to the printer 2, from which the request for registration has been transmitted, using HTTP (S104). The client ID, XMPP JID, and XMPP login password assigned to the printer 2 are contained in the registration information.

Upon receiving the registration information, the printer 2 stores the client ID, XMPP JID, and XMPP login password assigned to the printer 2 in the storage unit 21 (S106).

3. Program Update Management Method

Figure 3:
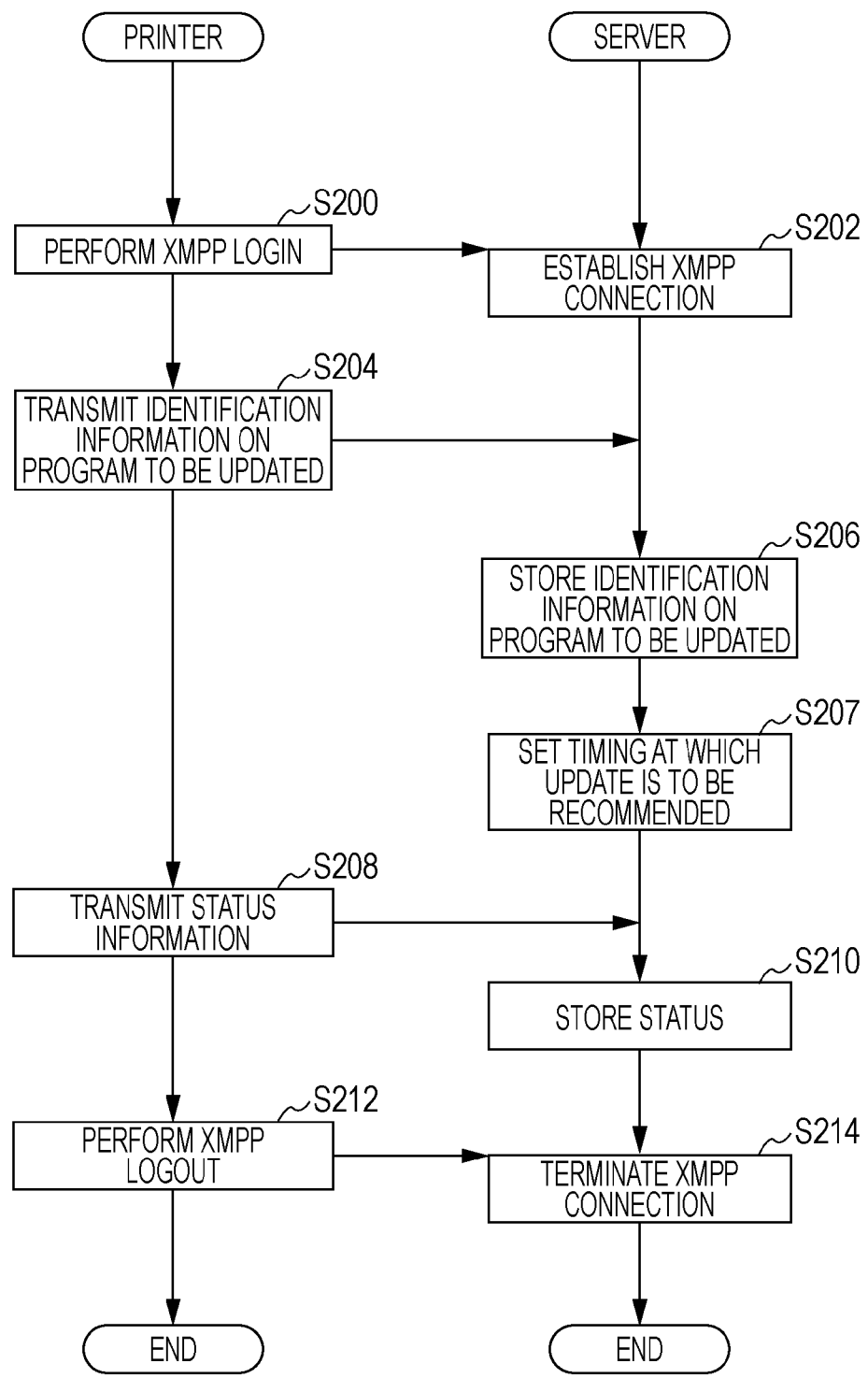
FIG. 3 is a sequence diagram illustrating the flow of setting a timing at which an update is to be recommended.

The update processing of a program to be managed is performed at timings at which an update is to be recommended. The timings are set when the power supply of the registered printer 2 is turned on, and when a new update program is stored in the program update management server 1. FIG. 3 is a sequence diagram illustrating the flow of processing from turning-on to turning-off of the power supply of the printer 2.

Upon turning-on of the power supply, the printer 2 transmits the XMPP JID and the XMPP login password, as client information, to the program update management server 1 (S200). Note that this processing is automatically performed also immediately after the setup.

Upon receiving the XMPP JID and the XMPP login password, the program update management server 1 establishes XMPP connection with the printer 2 (S202). Since the XMPP connection is established on the basis of the XMPP JID and the XMPP login password that have been transmitted immediately after turning-on of the power supply of the printer 2, the XMPP JID and the XMPP login password serve as information for identifying the power supply status of the printer 2.

The printer 2, for which the XMPP connection with the program update management server 1 has been established, transmits its client ID and identification information on a program to be managed, as client information, to the program update management server 1 using HTTP or XMPP (S204). The identification information on the program to be managed is information capable of uniquely identifying the type of the printing control program, the version of the printing control program, the menu types of the printer, the sub menu types of the printer, the language of the printer, and so on. Note that if the client ID can be uniquely identified on the basis of XMPP JID and the like, the client ID need not be transmitted from the printer 2. If the menu types of the printer, the sub menu types of the printer, the language of the printer, and the like do not affect the timing at which an update is to be recommended, such information also need not be transmitted.

Upon receiving the client ID and the identification information on the program to be managed, the program update management server 1 stores the identification information on the program to be managed in association with the client ID (S206). Specifically, the program update management server 1 registers the received identification information in association with the client ID of the printer 2 in the client database 211, and updates the power supply status to ON. This processing is equivalent to the processing of detecting the status of the printer 2.

Next, the program update management server 1 sets a timing at which an update for the printer 2 is to be recommended on the basis of the received identification information on the program to be managed (S207). That is, every time the power supply of a client is turned on, a timing at which an update is to be recommended is set for the client whose power supply has been turned on. Referring to the latest version of an update program stored in the storage unit 11 of the program update management server 1 and timings at which an update is to be recommended for other printers that are registered in the client database 211, the program update management server 1 sets a timing at which an update for the printer 2 is to be recommended such that the timings at which an update is to be recommended for a plurality of registered printers are dispersed. Specifically, a timing at which an update for the printer 2 is to be recommended is set such that the higher the frequency of use of the printer 2, the earlier the timing, and the older the version of the program to be managed, the earlier the timing. That is, if the frequency of use of the printer 2 is high and the version of the program to be managed is old, an earlier timing among settable timings may be set as a timing at which an update for the printer 2 is to be recommended. Otherwise, a later timing among settable timings may be set as a timing at which an update for the printer 2 is to be recommended. The term "settable timing" as used herein means a timing that meets the following requirement: the number of printers for which timings at which an update is to be recommended are set per fixed period of time is less than the maximum number of printers for which an update is recommended per fixed period of time, the maximum number of printers being set in consideration of a load imposed on the program update management server 1 and concentration of network traffic. Regarding the frequency of use, it may be determined that the later the date and time of the last printing, the higher the frequency of use. Also, it may be determined that the shorter the time interval between the starts of printing or the completions of printing, the higher the frequency of use. It may be determined that the larger the cumulative number of printed sheets, the higher the frequency of use. The set timing at which an update is to be recommended is registered in association with the client ID of the printer 2 in the client database 211. Note that if the version of the program to be managed is the latest, that is, if the version of the printing control program installed in the printer 2 is the same as the version of the latest update program stored in the program update management server 1, a value representing that updating is not yet determined is set as a timing at which an update is to be recommended. The arrival of a timing at which an update is to be recommended triggers transmission of an update program to the printer 2. Therefore, setting dispersed timings at which an update is to be recommended causes processing of transmitting the update program to be dispersed. This lightens a load imposed on the program update management server 1 and mitigates the concentration of network traffic.

When an event, such as start of printing, completion of printing, or a change in print setting, occurs in the ON state in which the power supply of the printer 2 is turned on, the printer 2 transmits status information in accordance with the event that has occurred, together with the client ID of the printer 2, to the program update management server 1 using HTTP or XMPP (S208). For example, upon start of printing, status information indicating the date and time of the start of printing is transmitted. Upon completion of printing, the program update management server 1 is notified of status information indicating the date and time of the completion of printing. Upon a change in print setting, the program update management server 1 is notified of status information representing print setting after the change.

Upon receiving status information, the program update management server 1 stores the status information in association with the client ID in the client database 211 (S210). This processing is equivalent to the processing of detecting the status of the printer 2. At this point, if the program update management server 1 receives the status information in accordance with completion of printing, the program update management server 1 registers the date and time of the completion of printing, as the date and time of the last printing, in association with the client ID in the client database 211. In the case where the number of printed sheets and print setting are received in accordance with completion of printing, these may be registered in the client database 211. By storing the date and time of the last printing, the program update management server 1 is enabled to determine the frequency of use of the printer 2. Further, in addition to the date and time of the last printing, information based on a usage history of the printer 2 that can be identified from status information, such as a time interval between the starts of printing or the completions of printing and the cumulative number of printed sheets, may be used as indexes for determining the frequency of use of the printer 2.

Upon accepting an operation of turning off the power supply, the printer 2 transmits a notice of logout for terminating the XMPP connection to the program update management server 1 (S212).

The program update management server 1 that has received the notice of logout terminates the XMPP connection with the printer 2 (S214). At this point, the program update management server 1 updates the client database 211 by changing, to OFF, the power supply status of the printer 2 whose XMPP connection has been terminated. This processing is equivalent to the processing of detecting the status of the printer 2.

Figure 4:
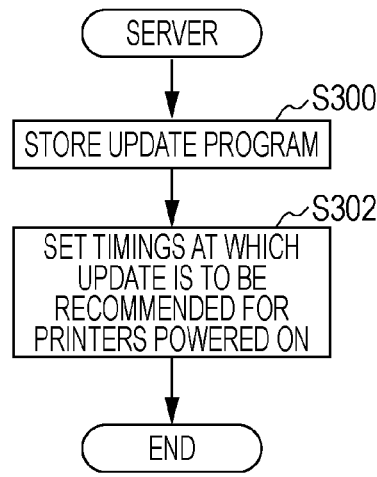
FIG. 4 is a sequence diagram illustrating the flow of setting timings at which an update is to be recommended.

FIG. 4 is a sequence diagram illustrating operation in which the latest update program is stored in the program update management server 1 and timings at which an update is to be recommended are set.

An update program for updating the program to be managed is stored in the storage unit 11 of the program update management server 1 in response to a predetermined operation by an administrator (S300). At this point, identification information on the update program stored in the storage unit 11 is stored, independently of the update program, in the storage unit 11. Note that, in this embodiment, the update program is compressed data of the latest version of the printing control program.

The program update management server 1, in which the latest update program is stored, refers to the client database 211 and sets timings at which an update is to be recommended for all printers whose power supply statuses are ON (S302). Specifically, the program update management server 1 acquires the program identification information and the date and time of the last printing from the client database 211 for all printers whose power supply statuses are ON, and sets dispersed timings at which an update is to be recommended. Specifically in this embodiment, timings at which an update is to be recommended are set for all printers whose power supply statuses are ON such that the higher the frequency of use, the earlier the timing, and the older the version of the program to be managed, the earlier the timing. At this point, timings at which an update is to be recommended are set such that the number of them does not exceed the maximum number of printers for which updates are recommended per fixed period of time. This maximum number of printers is set in consideration of a load imposed on the program update management server 1 and concentration of network traffic. Further, the program update management server 1 can identify a usage form other than the frequency of use of the printer 2 on the basis of status information received from the printer 2, and set a timing at which an update is to be recommended in accordance with the identified usage form. For example, in the case where the latest update program brings about a functional change of color printing, the timing at which an update is to be recommended for a printer whose print setting is color or a printer in which the number of printing operations in color is more than the number of printing operations in monochrome may be set earlier than that for a printer whose print setting is monochrome or a printer in which the number of printing operations in monochrome is more than the number of printing operations in color. Further, the program update management server 1 may set a timing at which an update is to be recommended in accordance with the destination (area, country) of the printer 2 or the program to be managed. The destination of the printer 2 or the program to be managed can be identified by using identification information on the program to be managed, the model ID of the printer, the serial number of the printer, and so on. As such, the timing at which an update is to be recommended can be set in consideration of various factors. Included in factors for determining a timing at which an update for each of printers is to be recommended are the status of each of printers and the usage history. The status of each of printers includes, in a broad sense, the type of an installed program to be managed, print setting, and the state of the power supply.

Figure 5:
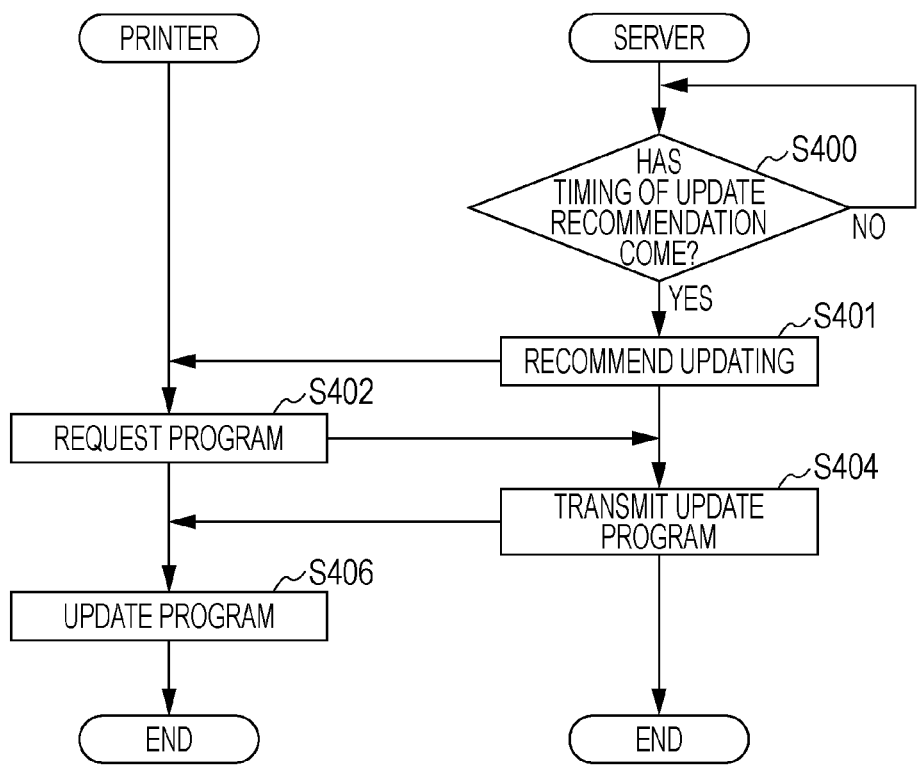
FIG. 5 is a sequence diagram illustrating the flow of transmitting an update program.

FIG. 5 is a sequence diagram illustrating the flow of transmitting an update program from the program update management server 1.

The program update management server 1 determines at regular time intervals whether a timing at which an update is to be recommended has arrived or not (S400). Specifically, the program update management server 1 compares the earliest one among timings at which an update is to be recommended that are registered in the client database 211 with the current time at regular time intervals. If the comparison result shows that the timing is the same as the current time, the program update management server 1 determines that the timing at which an update is to be recommended has arrived.

If the timing at which an update is to be recommended has arrived, then the program update management server 1 transmits information regarding recommendation of an update, using XMPP, to a printer for which the timing at which an update is to be recommended has arrived (S401). The information regarding recommendation of an update may be any information that allows a printer that receives this information to identify that the necessity for updating the program to be managed has occurred. In this embodiment, assume that a URL for downloading an update program from the program update management server 1 is transmitted as information regarding recommendation of an update. Transmission of information regarding recommendation of an update using XMPP enables the printer 2 to be notified of the necessity for updating a printing control program at the moment when a timing at which an update is to be recommended has arrived. Note that if the printer 2 is in a busy state such as a state during printing or a state during error processing at the moment when a timing at which an update is to be recommended has arrived, the program update management server 1 may set again a timing at which an update is to be recommended without transmission of information on recommendation of an update. It can be determined on the basis of the client database 211 whether the printer 2 is in a busy state.

Upon receiving the information regarding recommendation of an update, the printer 2 requests, using HTTP, the program update management server 1 to provide an update program of the printing control program, which is the program to be managed (S402). Specifically, using HTTP, the printer 2 requests a URL, which has been received as information regarding recommendation of an update, to transmit data. Note that the printer 2 may make a request for an update program immediately after receiving information regarding recommendation of an update, and may also make a request for an update program after the running process, such as printing, is completed.

When requested to provide an update program, the program update management server 1 transmits, using HTTP, the update program that meets the request to the printer 2 that has made the request (S404). Specifically, the compressed data of the latest version of the printing control program is transmitted to the printer 2.

Upon receiving the update program, the printer 2 updates the printing control program that is the program to be managed (S406). Specifically, for example, the installer of the printer 2 terminates the printing control program and deletes it from the storage unit 21, and develops the update program and stores an updated printing control program in the storage unit 21. Further, the installer updates various kinds of setting for executing the updated printing control program, and then starts the updated printing control program. Note that the update program may be a difference between the printing control program of the latest version and the printing control program before update. In this case, the printing control program before update is changed on the basis of the update program, without being deleted from the storage unit 21. Then, the printer 2 notifies the program update management server 1 of the version information on the printing control program after update or the completion of update, together with the client ID. Upon receiving notification of the version information on the printing control program after update or the completion of update, the program update management server 1 updates identification information on the program to be managed in association with the client ID. Specifically, the program update management server 1 updates the version of the printing control program registered in the client database 211 to the latest version after update in association with the received client ID of the printer 2.

With the embodiment described above, since an update program is transmitted to a printer in response to a timing at which an update is to be recommended that is set in accordance with client information, it becomes possible to automatically update the printing control program of the printer efficiently at an appropriate timing.

4. Other Embodiments

It is to be noted that the technical scope of the invention is not limited to the foregoing embodiment, and the invention can be, of course, varied and modified without departing from the scope of the invention, for example, by combining one or more of the following modifications.

For example, the program update management server 1 may be made up of a plurality of computers that are physically independent of each other, or may be made of a single computer.

A timing at which an update is to be recommended may be set arbitrarily. The timing at which an update is to be recommended may be set, for example, only when the latest update program is stored in the program update management server 1 or only when the power supply of a client is turned on. For example, when the latest update program is stored in the program update management server 1, a timing at which an update is to be recommended may be set without reference to client information. In order to set a timing at which an update is to be recommended without reference to client information, timings at which an update is to be recommended may be set only in such a manner that the timings are dispersed.

When making a request for an update program in S402, a printer may notify the program update management server 1 of a client ID, and if the program update management server 1 does not receive the request for an update program until a predetermined period of time has passed after the arrival of the timing at which an update is to be recommended, then the program update management server 1 determines on the basis of the client ID that an error has occurred, and may set again a timing at which an update is to be recommended. Likewise, if the program update management server 1 does not receive notification of the version information of a printing control program after an update or the completion of the update until a predetermined period of time has passed after the arrival of the timing at which the update is to be recommended, then the program update management server 1 determines on the basis of the client ID that an error has occurred, and may set again a timing at which an update is to be recommended.

As to the communications protocol between the printer 2 and the program update management server 1, other communications protocols may be used. For example, information regarding recommendation of an update may be transmitted using a push type communication protocol (a protocol that does not require a request from a client in order to perform processing from a server to the client), such as Session Initiation Protocol (SIP) or SIP for Instant Messaging and Presence Leveraging Extensions (SIMPLE), other than SMPP, and may also be transmitted using a pull type communication protocol (a protocol through which processing from a server to a client is necessarily performed in response to a request from the client) such as HTTP. In the case of transmitting information regarding recommendation of an update using a pull type communication protocol, although the amount of data traffic increases owing to polling, timings at which an update program is transmitted can be dispersed depending on setting of timings at which an update is to be recommended. Therefore, effects of reducing a load imposed on the program update management server and reducing the amount of network traffic can be sufficiently expected. Instead of XMPP, other protocols, such as Web Socket, may be used.

In the foregoing embodiment, a description has been given of an example in which, after receipt of a program request from a printer that has received information regarding recommendation of an update, an update program is transmitted from the program update management server 1. Alternatively, an update program may be transmitted together with information regarding recommendation of an update. For example, an update program may be transmitted to the printer 2 from the program update management server 1 using XMPP when a timing at which an update is to be recommended has arrived.

In the foregoing embodiment, the program update management server 1 transmits information regarding recommendation of an update to a printer at a timing at which an update is to be recommended, and the printer makes a request for an update program upon receiving the information regarding recommendation of an update. Alternatively, the program update management server 1 may set an update timing that is not a timing at which an update is to be recommended, and transmit information regarding recommendation of an update including the update timing to a printer in the order in accordance with the setting. Then, upon receiving the information regarding recommendation of an update, the printer may wait for the arrival of the update timing, and make a request for an update program after the update timing has arrived. Of course, both a timing at which an update is to be recommended and an update timing that is not the timing at which an update is to be recommended may be set, and the program update management server 1 may transmit information regarding recommendation of an update including the update timing at the timing at which an update is to be recommended.

What is claimed is:

1. A program update management server comprising:
a storage unit configured to store an update program for updating a program to be managed;
a setting unit configured to automatically set an update timing individually for each client of a plurality of clients in which the program to be managed is installed;
an update recommending unit configured to transmit information regarding recommendation of an update so that the client acquires the update program at the update timing; and
a program transmitting unit configured to transmit the update program, at the update timing, to the client that receives the information regarding recommendation of an update;
wherein the program update management server receives operational data from each client of said plurality of clients and sets the update timing individually for each client based on each client's respective operational data such that the update timings are dispersed;
wherein the setting of update times by the program update management server is further determined from the type of operations more prevalent in the clients as determined from their provided operational data; and
wherein the clients are printers, and if the type of operations more prevalent in a first client are color printing operations as compared to monochrome printing operations and the update program provides a functional change to color printing operations, then the update timing for the first client is set earlier than the update timing of a second client whose color printing operations are not more prevalent than monochrome printing operations.

2. The program update management server according to claim 1, further comprising:
a reception unit configured to receive, from the client, client information capable of identifying a status of the client, the program to be managed being installed in the client, and
wherein the setting unit sets the update timing in accordance with the status.

3. The program update management server according to claim 2, further comprising a reception unit configured to receive from the client, client information capable of identifying a version of the program to be managed, wherein the setting unit further sets the update timing in accordance with the version of the program to be managed.

4. The program update management server according to claim 1,
further comprising a reception unit configured to receive, from the client, said operational data, wherein said operational data determines a frequency of use of the program to be managed, the program to be managed being installed in the client,
wherein the setting unit sets the update timing in accordance with at least the frequency of use.

5. The program update management server according to claim 4, wherein
the frequency of use is determined based on the date and time of the last printing.

6. The program update management server according to claim 4, wherein
the frequency of use is determined based on a time interval between starts of printing.

7. The program update management server according to claim 4, wherein
the frequency of use is determined based on a time interval between completions of printing.

8. The program update management server according to claim 4, wherein
the frequency of use is determined based on a cumulative number of printed sheets per period of time.

9. The program update management server according to claim 4, wherein
the frequency of use is determined from the number of turn-on operations of the client per period of time.

10. The program update management server according to claim 1, wherein the program transmitting unit transmits the update program in response to a program request received from the client that received the information regarding recommendation of an update.

11. The program update management server according to claim 1, wherein the timings at which an update is to be recommended are dispersed among the client.

12. The program update management server according to claim 1, wherein
the update recommending unit transmits the information regarding recommendation of an update, using a first communication protocol;
the program transmitting unit transmits the update program, using a second communication protocol.

13. The program update management server according to claim 1, wherein the setting of update times by the program update management server is fully automatic without any human intervention.

14. The program update management server according to claim 1, wherein each client's update timing is automatically reset anew each time the client device is turned on.

* * * * *